UNITED STATES PATENT OFFICE.

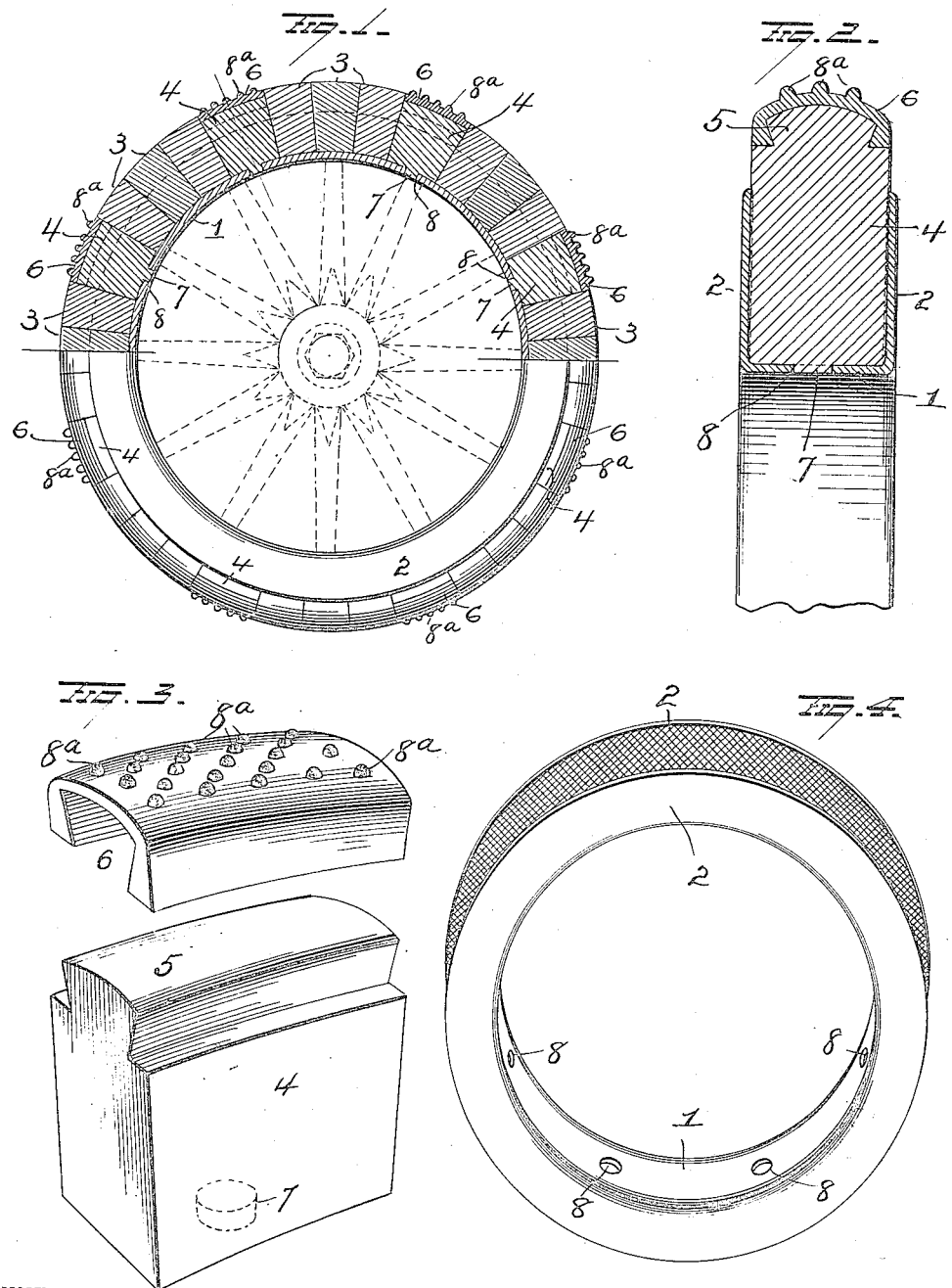

THOMAS TOOMEY, OF SCRANTON, PENNSYLVANIA.

TIRE.

1,037,686.

Specification of Letters Patent. Patented Sept. 3, 1912.

Application filed March 28, 1911. Serial No. 617,395.

*To all whom it may concern:*

Be it known that I, THOMAS TOOMEY, of Scranton, in the county of Lackawanna and State of Pennsylvania, have invented certain new and useful Improvements in Tires; and I do hereby declare the following to be a full, clear, and exact description of the invention, such as will enable others skilled in the art to which it appertains to make and use the same.

This invention relates to improvements in tires and more particularly to such as are adaptable for use with automobile wheels,— the object of the invention being to construct a tire in such manner as to avoid the great expense incident to the use of pneumatic and cushion tires employing rubber and fabric in their construction.

A further object is to provide an automobile tire which shall be composed largely of wood and to provide such a tire with simple and efficient means which can be easily applied or replaced, for preventing skidding, and thus avoid the use of and expense incident to chains heretofore employed on automobile tires for this purpose.

With these objects in view the invention consists in certain novel features of construction and combinations of parts as hereinafter set forth and pointed out in the claim.

In the accompanying drawings, Figure 1 is a view of a portion of a tire embodying my improvements. Fig. 2 is a transverse sectional view through the tire and through one of the wedge blocks having a shoe thereon. Fig. 3 is a detail view of one of the shoes, and Fig. 4 is a longitudinal sectional view of a portion of the channel rim with the wedge block removed.

The rim portion of my improved tire is preferably made of steel and of channel form, comprising an annular band or rim 1 with side flanges 2 of sufficient width to form a somewhat deep channel.

Within the channel rim, wedge-shaped wooden blocks which constitute the body of the tire *per se*, are placed and in order to prevent displacement of said blocks, the inner walls of the flanges 2 of the channel rim are roughened in any suitable manner so that when said blocks are forced into place between the flanges 2 they will be tightly held.

I prefer to make the blocks or wedges of hard wood such as hickory and to form their outer faces which constitute the tread of the tire, curved or convex.

In constructing the tire, I employ two series of wedge-blocks 3 and 4, the blocks 3 having plain convex outer tread portions and the blocks 4 being made somewhat shorter in depth than the blocks 3 and provided with dovetail heads 5 for the reception of shoes 6. By reason of the dovetail connection of the shoes to the blocks 4, radial and lateral displacement of said shoes will be prevented. Each shoe 6 is disposed between two blocks 3 and will be prevented by the latter from lengthwise or circumferential displacement, without necessity for other fastening. The bottom of each block 4 is provided with a tenon 7 to enter a socket 8 in the base of the channel rim 1. The shoe 6 is made of metal, preferably cast and chilled and is made of such dimensions that when it is placed in position on a wedge-block 4, its outer convex face will be in alinement with the outer convex faces which constitute the tread portions of the blocks 3. Each shoe 6 is provided with a plurality of projections $8^a$ which may be cast integral with the shoe and when the shoe shall have been chilled, said projections will be very hard. Any desired number of the blocks 4 and shoes 6 may be employed.

Slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention what I claim as new and desire to secure by Letters-Patent, is,—

A tire construction, comprising a channel rim of metal, two sets of wooden blocks disposed in said channel rim and constituting the body of the tire, said blocks projecting beyond the side flange of said channel rim, the outer ends of the blocks of one set forming portions of the tread of the tire and the outer ends of the blocks of the other set provided with dovetail heads, and metal shoes mounted on said dovetail heads and abutting at their ends against adjacent blocks of the first-mentioned set constituting portions of the tread of the tire, each metal shoe having a plurality of projections on its tread portion.

In testimony whereof, I have signed this specification in the presence of two subscribing witnesses.

THOMAS TOOMEY.

Witnesses:
   CHESTER A. THOMAS,
   JOHN R. THOMAS.